US012763306B2

(12) United States Patent
Poteshin

(10) Patent No.: US 12,763,306 B2
(45) Date of Patent: Oct. 13, 2026

(54) MASS SPECTROMETER ION SOURCE

(71) Applicant: IONOSCOPE LIMITED LIABILITY COMPANY, Moscow (RU)

(72) Inventor: Sergey Stanislavovich Poteshin, Moscow (RU)

(73) Assignee: IONOSCOPE LIMITED LIABILITY COMPANY, Moscow (RU)

( * ) Notice: Subject to any disclaimer, the term of this patent is extended or adjusted under 35 U.S.C. 154(b) by 270 days.

(21) Appl. No.: 18/696,390

(22) PCT Filed: Jan. 31, 2022

(86) PCT No.: PCT/RU2022/000027

§ 371 (c)(1),
(2) Date: Mar. 28, 2024

(87) PCT Pub. No.: WO2023/128797

PCT Pub. Date: Jul. 6, 2023

(65) Prior Publication Data

US 2025/0140544 A1 May 1, 2025

(30) Foreign Application Priority Data

Dec. 29, 2021 (RU) ............................ RU2021139722

(51) Int. Cl.

| | |
|---|---|
| ***H01J 49/16*** | (2006.01) |
| ***G01N 27/62*** | (2021.01) |
| ***H01J 49/04*** | (2006.01) |
| ***H01J 49/06*** | (2006.01) |
| ***H01J 49/40*** | (2006.01) |

(52) U.S. Cl.
CPC .......... *H01J 49/16* (2013.01); *H01J 49/0404* (2013.01); *H01J 49/0422* (2013.01); *H01J 49/061* (2013.01); *H01J 49/40* (2013.01); *G01N 27/62* (2013.01)

(58) Field of Classification Search
CPC .... H01J 49/16; H01J 49/0404; H01J 49/0422; H01J 49/061; H01J 49/40; G02N 27/62
See application file for complete search history.

(56) References Cited

U.S. PATENT DOCUMENTS 5,055,677 A * 10/1991 Amirav .................. H01J 49/00 250/288

* cited by examiner

*Primary Examiner* — Georgia Y Epps
*Assistant Examiner* — Hanway Chang

(57) ABSTRACT

The invention relates to the field of gas analysis and analysis of volatile organic substances, is intended for the generation of ions with soft ionization and can be used as an ion source in gas chromatographs (GC) with a mass spectrometric detector and other analytical instruments. A mass spectrometer with the said ion source and a method of ionization using the mass spectrometer are also described. The technical result consists in simplifying the design, reducing the mass and dimensions of the mass spectrometer and the ion source, ensuring controlled fragmentation of molecules, including eliminating unwanted fragmentation of molecules during the ionization process, increasing the sensitivity of the analysis of molecules with the subsequent possibility of easier decoding of mass spectral information, simplification installation and use of the ion source without changing the design of the mass spectrometer, providing a higher signal-to-noise ratio.

10 Claims, 2 Drawing Sheets

MASS SPECTROMETER ION SOURCE

FIELD OF THE INVENTION

The invention pertains to gas analysis and the analysis of volatile organic substances. It is designed to generate ions with soft ionization and can be used as an ion source in gas chromatographs (GC) with a mass spectrometric detector and other analytical instruments.

BACKGROUND OF THE INVENTION

Gas chromatography with mass spectrometry detection (GC-MS) is a widely used analytical tool. The main ionization method employed in GC-MS is electron impact (EI). A mass spectrometer typically comprises a vacuum chamber housing an ion source, a mass analyzer, and an ion detector. The gaseous sample is ionized in the ion source, and the resulting ions are separated according to their mass-to-charge ratio in the mass analyzer before being recorded by the detector.

The electron impact method is a commonly used technique for ionizing atoms and molecules in analytical applications. However, its main disadvantage is the fragmentation of molecules during the ionization process. Fragmentation that is not desired can greatly complicate the interpretation of mass spectra or make it impossible to analyze large molecules with dissociation thresholds lower than the ionization threshold. Electron impact ionization of such molecules practically eliminates the molecular, undestroyed ion. This problem is exacerbated when analyzing complex samples, such as oil, natural gas, and biological fluids. In the light part of the mass spectrum, fragments from heavy molecules overlap intensely with the peaks of light molecular ions. This overlap makes it difficult to interpret mass spectral information and reduces the sensitivity of the method.

The most similar device in terms of essential features is a mass spectrometer with an ion source, as described in document U.S. Pat. No. 5,055,677A from Oct. 8, 1991. Document U.S. Pat. No. 5,055,677A describes a mass spectrometer that samples at close to atmospheric pressure. A supersonic flow former is located behind the sampler, directing the supersonic jet into the vacuum chamber of the mass spectrometer. The spectrometer also includes means for ionizing material in a supersonic molecular beam, means for separating ions by their mass, and means for detecting the separated ions by mass. The document specifies electron impact as the preferred means for ionization. This invention solves the problem of molecular fragmentation by creating a dense molecular beam. The flow freezes the molecule's vibrational degrees of freedom, reducing the likelihood of fragmentation during electron impact. The authors named this approach EI-SMB-MS or ColdEI. The molecular beam in the prototype is formed as follows: a nozzle is installed at the outlet of the sample means, or in other words, from the GC column, to generate a supersonic flow. To form it, an additional helium flow 50-100 times higher than the sample flow with carrier gas from the GC column is pumped in front of the nozzle. Next, the supersonic jet passes through a skimmer, which cuts out a narrow molecular beam from it. One disadvantage of this approach is the need to use an additional gas flow to create a supersonic jet with the required density. To maintain the operating pressure in the mass spectrometer chamber, an additional intermediate vacuum chamber and powerful, expensive vacuum pumps are necessary along the flow path to enable differential pumping. The size and design of the IS are complicated by this, resulting in a significant increase in the device's cost.

SUMMARY OF THE INVENTION

The challenge is to create a method and devices for ionizing molecules without using expensive elements such as pumps or vacuum chambers. The proposed ion source will simplify the design of the mass spectrometer and reduce unwanted fragmentation during ionization, allowing for analysis of large molecules and easier decoding of mass spectral information. Additionally, it can be installed without changing the mass spectrometer's design, making it user-friendly. Soft ionization and a higher signal-to-noise ratio are also achievable.

The technical result consists in simplifying the design, reducing the mass and dimensions of the mass spectrometer and the ion source, ensuring controlled fragmentation of molecules, including eliminating unwanted fragmentation of molecules during the ionization process, increasing the sensitivity of the analysis of molecules with the subsequent possibility of easier decoding of mass spectral information, simplification installation and use of the ion source without changing the design of the mass spectrometer, providing a higher signal-to-noise ratio.

The ion source of the mass spectrometer achieves the technical result is attained due to the fact that ion source of mass spectrometer contains a vacuum chamber of the mass spectrometer, a channel supplying the analyzed material to the vacuum chamber of the mass spectrometer, a means for forming a molecular beam from the analyzed material coming through the channel and a means for ionization of the formed molecular beam installed in the vacuum chamber, characterized in that the means for forming a molecular beam is made in the form of a capillary assembly consisting of at least two capillaries, connected to a channel supplying the analyzed material into the vacuum chamber of the mass spectrometer, and located between the said supply channel and the ionization means.

In addition, the channel that supplies the analyzed material into the vacuum chamber of the mass spectrometer is a gas chromatograph capillary.

In addition, the ionization means is an electron impact ionizer or a photoionization ionizer.

The mass spectrometer contains a vacuum chamber, a channel supplying the analyzed material into the vacuum chamber, a means installed in the vacuum chamber for forming a molecular beam from the analyzed material entering through the channel, a means for ionizing the formed molecular beam and a means for separating ions in relation to mass to charge and detecting them, wherein the means for forming a molecular beam is made in the form of a capillary assembly consisting of at least two capillaries, connected to a channel supplying the analyzed material to the vacuum chamber of the mass spectrometer, and located between the specified supply channel and the ionization means.

In addition, an element is additionally installed between the ionization means and the means for separating ions in relation to mass to charge and detecting them, which deflects ions towards the mass analyzer.

In addition, the ionization means and the ion deflecting element are integrally formed.

The ionization method using a mass spectrometer contains the following steps: introducing the analyzed material into the vacuum chamber of the mass spectrometer through the supply channel;

forming a molecular beam containing the material to be analyzed using a means for generating a molecular beam;

directing the generated molecular beam to the means of ionization;

ionization of the generated molecular beam is carried out using the means of ionization;

the resulting ions are sent to a means for separating ions based on their mass to charge ratio and detecting them;

wherein the formation of a molecular beam is carried out using a capillary assembly consisting of at least two capillaries, connected to a channel supplying the analyzed material to the vacuum chamber of the mass spectrometer, and located between the specified supply channel and the ionization means.

In addition, before directing the formed ions after the ionization means to the means for separating the ions according to the mass-to-charge ratio and detecting them, the neutral component of the molecular beam is separated from the ionized molecules.

DETAILED DESCRIPTION

Figure 1:
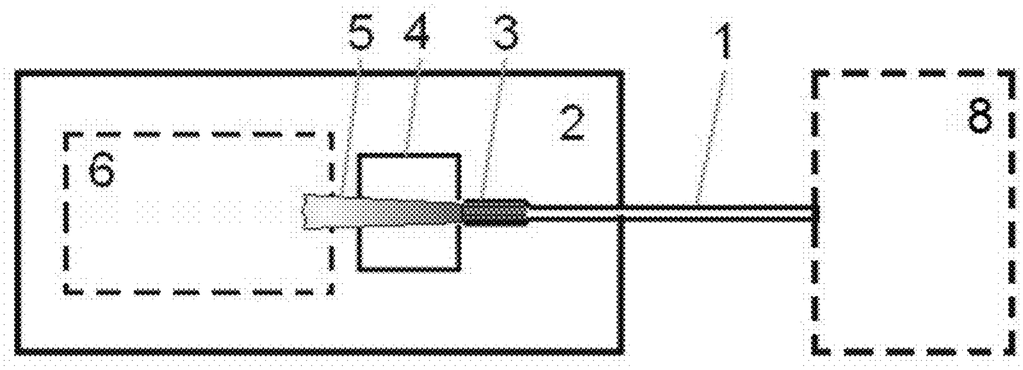
FIG. 1—Schematic of a mass spectrometer with an ion source.

The mass spectrometer comprises a vacuum chamber (2), a supply channel (1) for the analyzed material, a means (3) for creating a molecular beam (5) from the material entering through the supply channel (1), a means (4) for ionizing the molecular beam (5), and a means (6) for separating and detecting ions based on their mass-to-charge ratio.

The ion source is a component of a mass spectrometer and comprises a vacuum chamber (2), a supply channel (1), a molecular beam forming means (3), and an ionization means (4).

The analyzed gas, which consists of the material and its vapors along with the carrier gas, enters the vacuum chamber (2) of the mass spectrometer through the supply channel (1). The input channel (1) for the analyzed gas is a capillary, such as a gas chromatograph, which is connected at one end to the chromatographic column (8) and at the other end to the means (3) for forming the molecular beam (5). The supply channel (1) terminates at the means (3) for creating the molecular beam (5), which is located within the vacuum chamber (2). The means (3) for creating the molecular beam is designed as a capillary assembly. The analyzed gas is then passed through capillary assembly (3). It is important to note that only a portion of the analyzed gas should be supplied to the capillary assembly, or an additional gas flow (preferably helium) can be supplied. However, it is crucial that the total gas flow does not exceed the flow that can be pumped out by a standard pump without compromising the vacuum in the mass spectrometer chamber. The gas passes through the capillary assembly (3), forming a molecular beam (5) at its outlet. This beam enters the ionization means (4), which can use various ionization methods, such as electron impact or photoionization.

The apparatus for generating the molecular beam (3) is situated within a vacuum chamber, between the electron ionization means (4) and the channel (1) that supplies the analyzed material (GC capillary). The molecular beam (5), produced by the capillary assembly, intersects with the flow of electrons, which ionizes the analyzed gas. The ionization means (4) can be positioned in close proximity to the apparatus for generating the molecular beam within the vacuum chamber.

After the ionizer (4), the resulting ions are sent through other elements of the mass spectrometer, such as the means (6) for separating ions based on their mass-to-charge ratio and detecting them. The means (6) may have input focusing ion optics for more efficient ion transport into the mass analyzer area. The separation can be achieved through various methods, such as using a quadrupole mass filter, time-of-flight, or magnetic mass analyzer.

The devices and ionization method described in this invention rely on a means (3) for creating a molecular beam. This means is installed at the end of the channel through which the analyzed sample flows. The molecular flow regime is organized in individual capillaries, which are assembled into an assembly that may contain two or more capillaries. This capillary assembly provides a highly targeted molecular flow of the analyzed gas. In the ionization zone of the molecular beam, excess internal energy from ionization creates a local pressure increase. Colliding with the carrier gas reduces the molecule's energy below the dissociation threshold, allowing it to remain intact.

Figure 4:
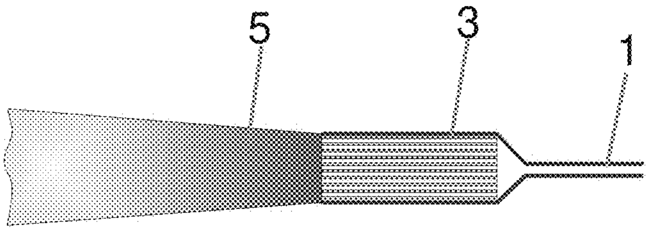
FIG. 4—Means for forming a molecular beam based on a capillary assembly.

FIG. 4 shows the means for forming a molecular beam through a capillary assembly. The geometric parameters of the capillary assembly (3) may vary. The diameter of the channels or capillaries can range from $10^{-5}$ mm to 0.5 mm, and their shape is not critical for the implementation of the invention. The assembly can contain 2, 3 or more capillaries, depending on the cross-sectional area of the capillary assembly and the outer diameter of the individual channel. For instance, the number of individual capillaries in a circular assembly with round capillaries can be calculated using the formula $Rarray^2/Rcap^2*k$. Here, Rarray represents the cross-sectional area of the assembly, Rcap represents the cross-sectional area of an individual capillary along the outer diameter (including walls), and k represents the filling factor. The filling factor is approximately 0.9 for the number of grouped capillaries greater than 100. For an assembly with a preferred outer diameter of 2 mm and individual capillary diameter of 20 μm, the number of capillaries in the assembly will be $3.6*10^3$. The maximum number of capillaries is limited by the selected assembly area and capillary diameter, and can reach up to $10^8$.

The gas flow density at the outlet of the capillary assembly will be determined by the total conductivity of the capillary assembly and the gas flow supplied to its inlet.

The cross-section of the capillary assembly can be round, rectangular, ring-shaped or other shape. In these cases, it is possible to form a molecular beam that has the cross-sectional shape of a capillary assembly. It is advisable to select the shape and cross-sectional size of the capillary assembly so that it is smaller than the cross-section of the flow of ionizing particles, for example, smaller than the cross-section of the beam of ionizing electrons. In this case, the sample will be used as efficiently as possible and the sensitivity will be higher.

The capillary assembly can range in length from 0.2 mm to 10 cm. To achieve a molecular beam with a narrow angular distribution, select the optimal diameter and length of the capillaries so that the molecular flow regime occurs over most of their length. It is recommended to choose a length at which the molecular flow regime occurs for 20-100 capillary diameters. A directed molecular beam with a narrow angular distribution is formed at the exit of such a system. However, this ratio can vary significantly, affecting both the divergence of the molecular beam and the resistance to the incoming gas flow. Smaller values result in increased divergence of the molecular beam, while larger values increase the resistance to the flow of the analyzed gas with the carrier gas.

The flow regime is determined by the Knudsen number Kn. The molecular mode will occur in the case when Kn>1.

$$Kn = \frac{k_b \cdot T}{\sqrt{2} \cdot \pi \cdot Dg^2 \cdot P \cdot D},$$

where $k_b$ is the Boltzmann constant, T is the flow temperature, Dg is the diameter of the carrier gas molecule, P is the pressure in the capillary, D is the internal diameter of the capillary.

The study analysed the flow angular distribution at the outlet of individual capillaries and capillary assemblies under different inlet pressures. The results showed that for a capillary assembly with 50 μm channels, an assembly diameter of 0.9 mm, a length of 5 mm and a pressure range similar to that used in GC-MS, the solid angle of the emerging helium molecular beam was between 5-6 degrees. The experiment's pressure range was between 0.01-5 Torr before the capillary assembly, while the vacuum chamber's pressure at the outlet of the capillary assembly was maintained at ~$10^{-5}$-$10^{-4}$ Torr. Within this range, the molecular beam's divergence from the capillary assembly was 3-10 times less than that of a single capillary exit, with similar conductivity.

Thus, the gas stream at the exit of the capillary assembly will represent a weakly divergent beam of molecules.

When choosing capillary assembly parameters, it is important to ensure that the overall conductivity does not impede the flow of carrier gas from the GC column. This is because a typical GC carrier gas flow is 1-2 mL/min. Therefore, the conductivity of the capillary assembly must be sufficient to allow for adequate volumetric flow through the capillaries. The formula for calculating the conductivity of an individual capillary in molecular flow mode is $Ucap=38.1\cdot Dcap^3\cdot(Tcap/m)^{1/2}/Lcap$. This formula takes into account the internal diameter of the capillary (Dcap), the gas temperature (Tcap), the mass of gas molecules (m), and the length of the capillary (Lcap). The assembly's conductivity can be calculated using the formula $Uarray=Ucap\cdot(Darrey/Dcap)^2\cdot Kf$, where Darrey represents the outer diameter of the assembly and Kf is the filling factor, which is approximately 0.8 for capillary assemblies of this type. Below are some typical options to consider. By reducing the length of the capillaries and increasing their diameter, while maintaining the outer diameter of the capillary assembly within the cross section of the electron beam (e.g. Darrey=1.5 mm), the flow at the exit from the capillaries will turn into a supersonic flow. In this mode, the gas flow remains constant even with increasing pressure at the inlet of the assembly. The transition to this flow regime begins when the pressure ratio between the outlet of the capillary (P1) and the chamber (P2) where the ion source is located is less than the specified ratio:

$$\frac{P2}{P1} < \left(\frac{2}{\gamma+1}\right)^{\frac{\gamma}{\gamma+1}}$$

where γ is the adiabatic index of the carrier gas. For monatomic gases, such as helium, γ equals 1.67. When P2/P1 is approximately 1.8, the flow becomes supersonic. Calculating the parameters accurately is labor-intensive due to the self-consistent problem that arises from considering the conductivity of the capillary assembly and the mixed flow regime. Calculating the parameters accurately is labor-intensive due to the self-consistent problem that arises from considering the conductivity of the capillary assembly and the mixed flow regime. The simulation demonstrated that a Mach barrel is formed at the outlet of the capillaries when Dcap=20 μm, Pin~5 Torr, and Lcap=0.5 mm. The selected capillary assembly parameters and pressures result in a mixed flow regime, combining molecular and partially viscous flow, and a supersonic flow is formed at the outlet of the capillaries. Based on the simulation results, the volumetric flow through a single capillary is approximately Q1cap=1.4E-10 $m^3$/sec. This ensures that the capillary assembly does not significantly impede the gas flow of the GC, which requires more than 250 of such capillaries to achieve a flow rate of Qgh~1 ml/min.

For capillaries with a small diameter, such as Dcap=5 μm, the molecular flow regime will occur at inlet pressures up to 20 Torr. Capillary conductivity can be estimated using the formula $Ucap=38.1\cdot Dcap^3\cdot(Tcap/m)^{1/2}/Lcap$. To ensure that the assembly does not create significant resistance to the gas flow from the GC, its conductivity must be greater than the volumetric flow from the GC, i.e. the ratio $(38.1\cdot Dcap\cdot Darrey^2\cdot(Tcap/m)^{1/2}/Lcap\cdot Qrx)$ must be greater than 1. This relationship is satisfied when using the following parameters: Dcap=5 μm, Darrey=0.5 mm, and Lcap=2 mm.

To create a more focused molecular beam, it is recommended to select capillaries with a smaller diameter. The angle at half the width can be approximated using θ1/2=Dcap/MFP, where MFP represents the average distance a molecule or atom travels within a capillary.

Figure 2:
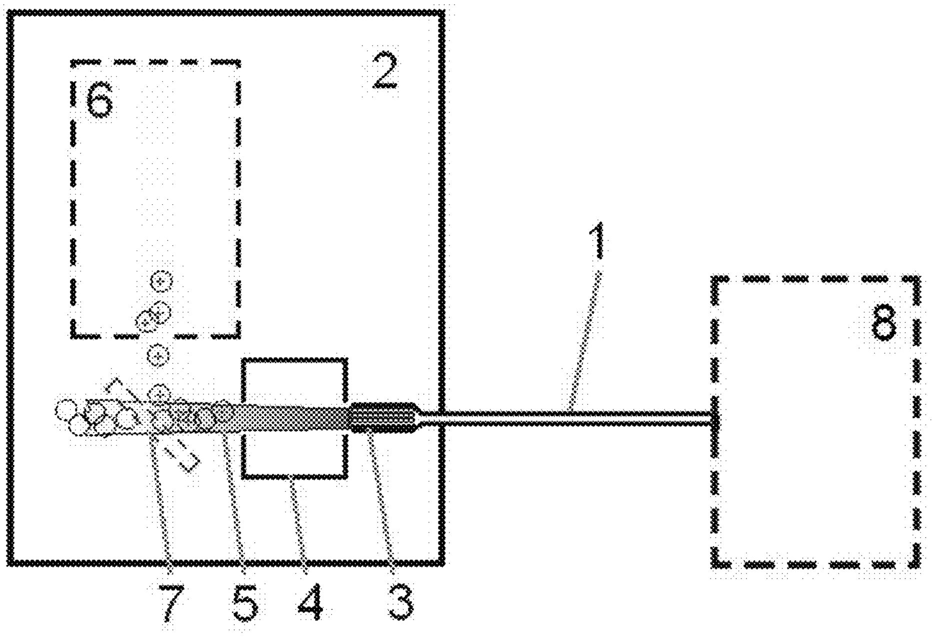
FIG. 2—Schematic of a mass spectrometer with an ion source with ion deflection.

The ion source with a capillary assembly can be used in any mass spectrometer without significant changes to its design. FIG. 2 illustrates a mass spectrometer that uses the inventive ion source. An ion deflecting element (7) is provided between the ionization means (4) and the ion separation means 6 in terms of mass to charge and their detection. The diagram illustrates a capillary assembly (3) from which a molecular beam (5) weakly diverges at the exit. The gas stream then passes through the ionization means (4) before being directed towards the ion deflecting element (7).

The ion-deflecting element separates the neutral component of the molecular beam, which includes non-ionized molecules and sample clusters, as well as the carrier gas, from the ionized sample molecules. The resulting ions are directed to the mass analyzer. The ion source and deflecting element work together to prevent the neutral component from settling on nearby surfaces of the ionization means (4). This reduces the device's noise level.

Figure 3:
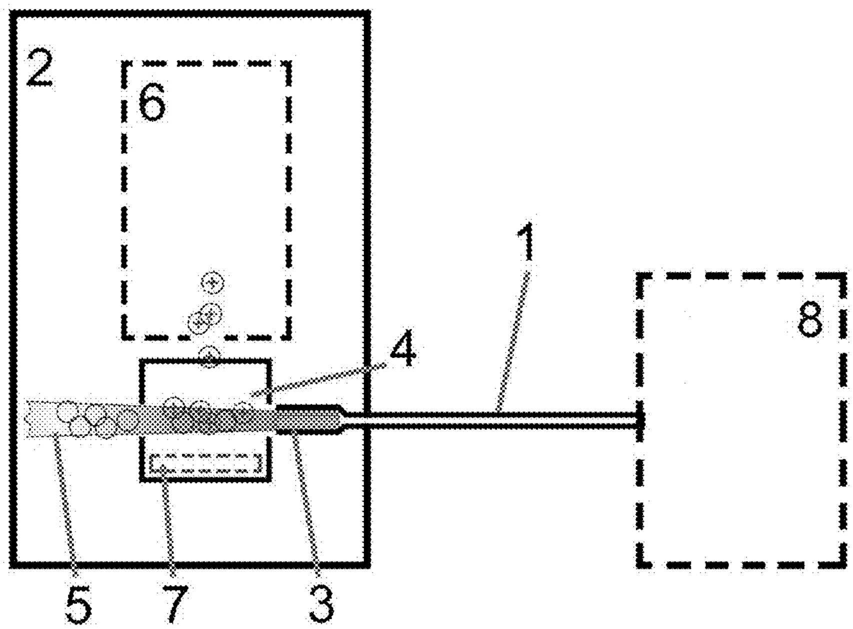
FIG. 3—Schematic of a mass spectrometer with an ion source, which is part of a time-of-flight mass spectrometer.

The ion source can be used in a time-of-flight mass spectrometer, as shown in FIG. 3. The implementation method is simple and does not require significant changes to the mass spectrometer's design. The only requirement is to place the molecular beam former 3 at the exit of the analyzed gas input channel (1). Molecular beam (5) enters the ion source of the time-of-flight mass spectrometer and undergoes ionization through electron impact. The resulting ions are then directed towards the ion separation and detection means (6), which is the mass analyzer. The neutral component of the molecular beam continues to pass through. In this case, ionization and ion-rejection occur simultaneously. Element (7) serves as a pulsed ion packet former for a time-of-flight mass analyzer. One electrode is a grid, and a pushing pulse is applied to the other electrode. Alternatively, ionization can occur before ion-rejection, in which case element (7) functions as an orthogonal ion accelerator for a time-of-flight mass spectrometer.

Preferably, helium is used as the carrier gas, although hydrogen, argon, nitrogen, CO2, NH3, or other gases may also be used depending on the chromatograph. The mass spectrometer can be based on a quadrupole, time-of-flight mass analyzer, or any other known type of mass spectrometer.

The proposed invention simplifies the formation of molecular beam for soft ionization compared to prior art solutions. In the prototype, a supersonic jet is formed using a specially configured nozzle at the exit from the GC column. To achieve this, a helium flow is pumped at the outlet of the GC column, in front of the nozzle, at a rate 50-90 times higher than the initial flow from the GC column. The supersonic jet that is formed then passes through a skimmer, which selects a narrow molecular beam. In this molecular beam, the vibrational degrees of freedom of the sample molecules are 'frozen'. As a result of subsequent ionization by electron impact, the proportion of unfragmented molecular ions increases. To implement this method, an additional pumping chamber with a turbomolecular pump is required.

The ionization flow in the present invention is formed by a capillary assembly and directed towards the ionization device. To achieve this, the carrier gas flow with sample, which enters from the GC capillary is directly routed to the capillary assembly. The gas flow has a narrow angular distribution upon exiting. In this case, there is no need for an additional helium flow or vacuum chamber with an expensive pump to pump out the forming flow. The total flow leaving the capillary assembly has a smaller divergence angle compared to a single capillary of solutions known from the prior art.

Through the use of the invention, controlled fragmentation of molecules is achieved, and the invention also makes it possible to increase the signal-to-noise ratio and, accordingly, increase the sensitivity of the analysis for a number of reasons:

1) Due to a local increase in the partial pressures of the sample in the ionization region. Due to the fact that the formed molecular beam at the exit from the capillary assembly has a divergence angle approximately 10 times smaller compared to the flow that is formed at the end of the GC capillary. Thus, a larger amount of sample material enters the volume where the ionizing electron flow passes.
2) By reducing the background of the device. The flow from the capillary, due to its low divergence, will pollute the surrounding surfaces of the ionization means 4 to a lesser extent.
3) The energy of ionized sample molecules will be higher than the energy of background ions and the background can be cut off using an energy filter.

Application of the invention does not require the use of an additional helium flow and an additional pumping chamber with an expensive pump. The design of ion sources, including those already in the user's possession, is greatly simplified; it may not affect the basic design elements and operates through the use of a capillary assembly installed on the tip of a chromatographic column, which can be used with an ionization agent already present in the device.

When applied to a time-of-flight mass spectrometer, this invention increases the resolution of the mass analyzer by reducing the ion rotation time in the ejector gap of the ion source. This results in a decrease in the initial duration of the ion packet by reducing the initial spread of ion velocities in the direction of ejection in a weakly diverging molecular beam.

According to the invention, the soft ionization ion source can be used as a separate option that can be installed in the mass spectrometer chamber. Implementation of the invention in the proposed embodiment does not require changes in the design of the mass spectrometer chambers and it is possible to do without additional DC or RF power channels. To implement it, it is necessary to connect the channel (1), through which the analyzed sample enters, with the capillary assembly, the assembly (3) is located in front of the ionization device (4). For connection, you can additionally use an adapter, into which the capillary assembly is mounted on one side, and the other side is adapted for docking with a gas chromatograph transfer. To avoid sample loss, it is preferable to make a sealed connection between the capillary assembly (3) and channel (1). In one embodiment of the invention, parts of a standard ion source are used as ionization device (4), including a cathode for generating electrons, a magnet for focusing the flow of electrons, and focusing ion optics. But also, the invention can be implemented using a specially manufactured ionization device, for example based on an open-type electron impact ion source. For each type of mass spectrometer, the problem of placing an ion source with soft ionization is solved separately. For example, for TOF GC/MS, placement of the capillary assembly can be as simple as possible. In this case, at the output of the GC transfer, or channel (1), it is enough to install an adapter with a capillary assembly (3).

The invention claimed is:

1. An ion source of a mass spectrometer containing a vacuum chamber of the mass spectrometer, a channel supplying the analyzed material to the vacuum chamber of the mass spectrometer, a means for forming a molecular beam from the analyzed material coming through the channel and a means for ionization of the formed molecular beam installed in the vacuum chamber, characterized in that the means for forming a molecular beam is made in the form of a capillary assembly consisting of at least two capillaries, connected to a channel supplying the analyzed material into the vacuum chamber of the mass spectrometer, and located between the said supply channel and the ionization means.

2. The ion source of the mass spectrometer according to claim 1, characterized in that the channel supplying the analyzed material to the vacuum chamber of the mass spectrometer is a gas chromatograph capillary.

3. The ion source of a mass spectrometer according to claim 1, characterized in that the ionization means is an electron impact ionizer or a photoionization ionizer.

4. A mass spectrometer containing a vacuum chamber, a channel supplying the analyzed material to the vacuum chamber, a channel supplying the analyzed material to the vacuum chamber of the mass spectrometer, a means for forming a molecular beam from the analyzed material coming through the channel and a means for ionization of the formed molecular beam installed in the vacuum chamber, characterized in that the means for forming a molecular beam is made in the form of a capillary assembly consisting of at least two capillaries, connected to a channel supplying the analyzed material into the vacuum chamber of the mass spectrometer, and located between the said supply channel and the ionization means.

5. The mass spectrometer according to claim 4, characterized in that the channel supplying the analyzed material into the vacuum chamber of the mass spectrometer is a gas chromatograph capillary.

6. The mass spectrometer according to claim 4, characterized in that the ionization means is an electron impact ionizer or a photoionization ionizer.

7. The mass spectrometer according to claim 4, characterized in that an ion-rejecting element is additionally installed between the ionization means and the means for separating ions based on the mass-to-charge ratio and detecting them.

8. The mass spectrometer according to claim 4, characterized in that the ionization means and the ion deflecting element are made in one piece.

9. An ionization method using a mass spectrometer, characterized in that it contains the following steps:

introducing the analyzed material into the vacuum chamber of the mass spectrometer through the supply channel;

forming a molecular beam containing the material to be analyzed using a means for generating a molecular beam;

directing the generated molecular beam to the means of ionization;

ionization of the generated molecular beam is carried out using the means of ionization;

the resulting ions are sent to a means for separating ions based on their mass to charge ratio and detecting them;

wherein the formation of a molecular beam is carried out using a capillary assembly consisting of at least two capillaries, connected to a channel supplying the analyzed material to the vacuum chamber of the mass spectrometer, and located between the specified supply channel and the ionization means.

10. The ionization method according to claim 9, characterized in that before directing the formed ions after the ionization means to the means for separating ions in the mass-to-charge ratio and detecting them, the neutral component of the molecular beam is separated from the ionized molecules.

* * * * *